March 2, 1954 R. C. BEACHAM 2,670,740
BLOOD TRANSFER SET
Filed Sept. 1, 1951
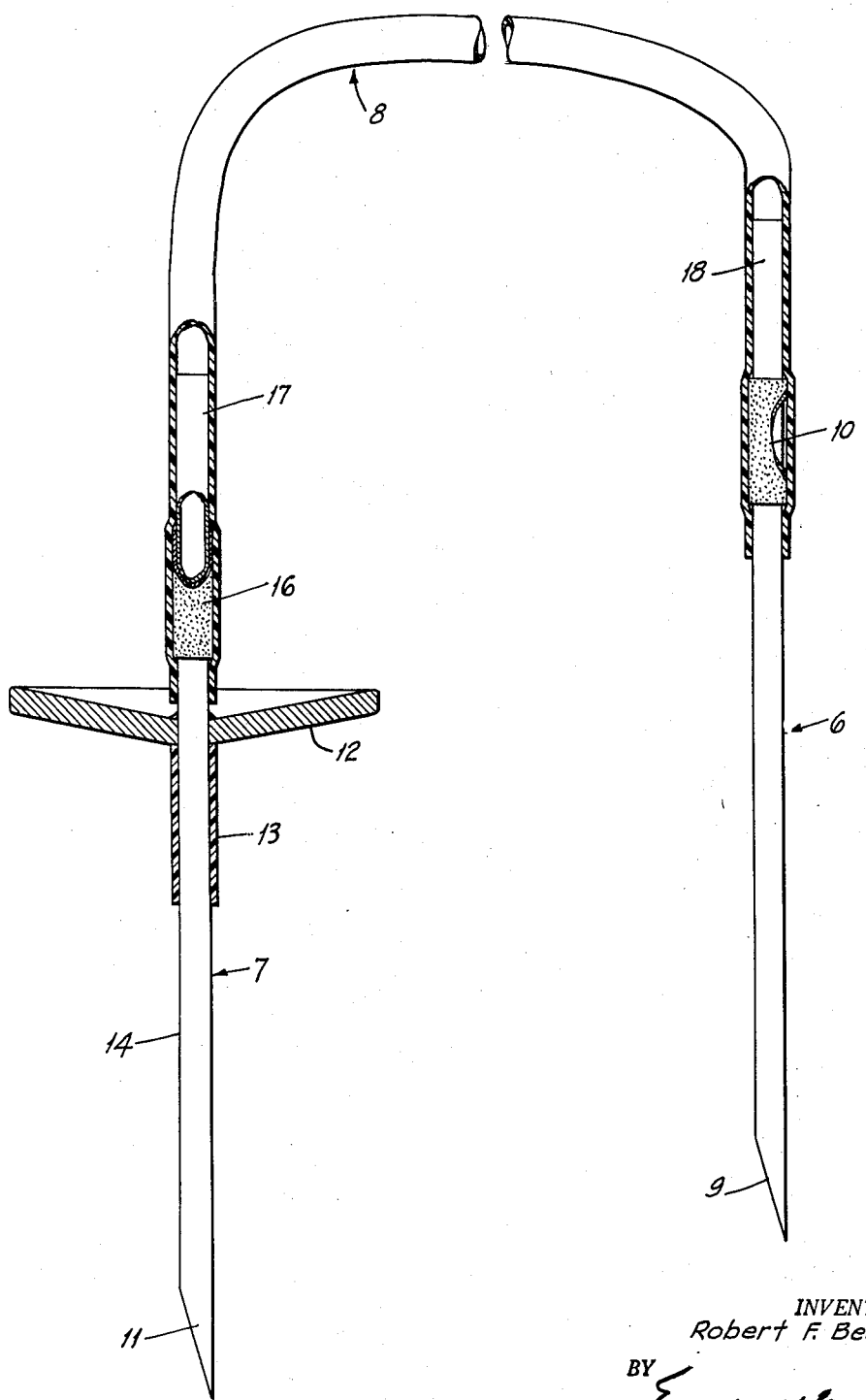
INVENTOR.
Robert F. Beacham
BY
*Eckhoff & Slick*
HIS ATTORNEYS

UNITED STATES PATENT OFFICE 2,670,740

BLOOD TRANSFER SET

Robert C. Beacham, Richmond, Calif., assignor to Cutter Laboratories, Inc., a corporation of California Application September 1, 1951, Serial No. 244,802

5 Claims. (Cl. 128—214)

This invention relates to an improvement in blood transfer sets and particularly to an improved connection between a flexible tubing and a metal tube such as a hollow spike or a cannula.

Present transfer sets include a flexible tubing, a hollow spike and a cannula. The flexible tubing is secured to the spike and to the cannula by providing the blunt end of the spike and the cannula with several enlarged peripheral portions which expand the flexible tubing and so hold it with a tight frictional engagement because of expansion of the flexible tubing. The spike and cannula are usually made with an exterior of polished metal. Upon heating or sterilization of the assembly the compressive forces in the tubing are relieved and the attachment of the tubing to the cannula and spike cannot be depended upon against the forces which may be encountered in use.

In accordance with the present invention, I provide a flexible-tubing-to-metal-tube connection which is relatively simple and which can be readily provided with a decrease in manufacturing costs. I have found that by providing a metallized surface upon a portion of the metal tube employed for the hollow spike or cannula, a secure joint can be effected between the tubing and the cannula which is not affected by sterilization temperatures and which resists adequately the forces encountered in normal use. The provision of such metallized surface on the exterior surface of the polished metal tubing utilized for the tubular spike or cannula is relatively simple and the composite structure is quite inexpensive to manufacture.

A further advantage is found in that the rough metallized addition to the metal tube need only exceed the diameter of the tube by a very small amount so that one can employ a flexible tube of very small diameter, approximating that of the metal tube. This enables the flow rate of blood through the assembly to be held to a longer period without any exact adjustment as is required when larger bore flexible tubing is employed.

It is an object of the present invention to provide an improved connection between a flexible plastic tubing and a hollow spike or cannula.

Another object of the present invention is to provide an improved cannula construction.

A further object is to provide a simplified blood transfer set including a bottle spike, tubing and cannula.

The invention includes other objects and features of advantage, some of which, together with the foregoing, will appear hereinafter wherein the present preferred form of the improved transfer set is disclosed.

In the drawing accompanying and forming a part hereof, the single figure is a side elevation partly in section through an improved transfer set embodying the present invention.

Referring to the drawing, the transfer set includes a donor needle or cannula generally indicated at 6, a bottle spike generally indicated at 7, the two being connected by a flexible tubing generally indicated at 8. The cannula 6 is suitably sharpened as at 9 and includes intermediate the ends thereof a roughened surface portion 10.

The hollow spike 7 which is to be inserted in a collection vessel includes a sharpened end 11 and an integral hub 12 intermediate its ends and adapted to be engaged suitably by the fingers of an operator so that it can be inserted readily into a stopper in a bottle in a manner well-known in the art. A length of flexible tubing 13 is provided upon shaft 14 of the bottle spike 7 to provide a spacer engaging the bottle stopper when the bottle spike 7 is in place and permit the fingers of an operator to be placed between the hub and the bottle stopper to remove the spike. A metallized portion 16 is provided upon the spike 14 beyond the hub 12.

Each metallized portion 10 and 16 is placed upon the tube during manufacture. The metallizing of metal is well-known in the art and it will suffice for the purposes of the present disclosure to indicate that a rough metallized surface is provided which extends above the surface of each tube about 0.010". When the flexible tubing is slipped over the ends 17 and 18 of the tubes 6 and 7, a firm, positive connection is provided which will withstand all forces encountered in normal use after the assembly has been subjected to a sterilizing temperature for an adequate period of time.

From the foregoing, I believe it will be apparent that I have provided a novel, simple and improved transfer set. In practice, I have used a flexible plastic tubing having an inside diameter of 0.046", while each metal tube has an outside diameter of 0.058". The inside diameter of the tubing and tubes was 0.046". The construction so provided enabled the usual vacuum transfer to be made from a donor in a period of about 4½ minutes without special manipulative procedure as compared to a usual 1½ minutes without such procedure. The outside diameter of the metallized portion on each metal tube was 0.060", while each tube was of 0.058" outside diameter. The tubing remained in place in use after the usual sterilizing with adequate security.

I claim:

1. In combination, a flexible plastic tubing having a hollow spike inserted in one end thereof and a cannula inserted in the other end thereof, the spike and cannula each having a rough metal deposit on the outer surface thereof intermediate their ends and engaged with the flexible tubing.

2. In combination, a flexible plastic tubing having a hollow spike inserted in one end thereof and a cannula inserted in the other end thereof, the spike and cannula each having a rough metal deposit on the outer surface thereof intermediate their ends and engaged with the flexible tubing, the inside diameter of the tubing, spike and cannula being substantially the same.

3. In a blood transfer set including a flexible tube having a hollow spike inserted at one end and a cannula inserted in the other, the improvement consisting in a rough, metallized deposit upon a peripheral portion of an end of each of the spike and cannula to engage the tubing and retain it in place upon an end of the spike and of the cannula.

4. A cannula formed with a piercing part at one end and having a rough metal coating deposited on the outer surface of the cannula adjacent its other end.

5. In a blood transfer set, a flexible tube, a metal tube having a sharpened end and a blunt end to be inserted in the flexible tube, a portion of the outer surface of the metal tube adjacent to said blunt end and having a rough, metallized deposit thereon to engage and retain said flexible tube in place on the blunt end of the metal tube.

ROBERT C. BEACHAM.

References Cited in the file of this patent

UNITED STATES PATENTS

| Number | Name | Date |
|---|---|---|
| 950,822 | McElroy | Mar. 1, 1910 |
| 2,231,418 | Trotter | Feb. 11, 1941 |
| 2,362,537 | Butler | Nov. 14, 1944 |
| 2,430,921 | Edelmann | Nov. 18, 1947 |
| 2,581,331 | Ryan et al. | Jan. 1, 1952 |
| 2,607,347 | Kleiner | Aug. 19, 1952 |

FOREIGN PATENTS

| Number | Country | Date |
|---|---|---|
| 15,900 | Great Britain | Nov. 11, 1915 |